United States Patent
Koguchi et al.

(12)

(10) Patent No.: US 6,261,622 B1
(45) Date of Patent: Jul. 17, 2001

(54) WATER-DISPERSIBLE CAROTENOID PIGMENT PREPARATION

(75) Inventors: Masaru Koguchi; Takeshi Fukuda; Hideki Sakamoto, all of Tochigi (JP)

(73) Assignee: Kagome Co., Ltd., Nagoya (JP)

( * ) Notice: Subject to any disclaimer, the term of this patent is extended or adjusted under 35 U.S.C. 154(b) by 0 days.

(21) Appl. No.: 09/068,054

(22) PCT Filed: Mar. 18, 1998

(86) PCT No.: PCT/JP98/01161

§ 371 Date: Nov. 1, 1999

§ 102(e) Date: Nov. 1, 1999

(87) PCT Pub. No.: WO99/08549

PCT Pub. Date: Feb. 25, 1999

(30) Foreign Application Priority Data

Aug. 13, 1997 (JP) .................................................. 9-218796

(51) Int. Cl.[7] .............................. A23G 1/27; A23G 1/275
(52) U.S. Cl. ........................... 426/540; 426/590; 426/599; 426/654
(58) Field of Search ..................................... 426/540, 651, 426/654, 655, 590, 599

(56) References Cited

U.S. PATENT DOCUMENTS

| | | | |
|---|---|---|---|
| 3,081,171 | * | 3/1963 | Reiners et al. . |
| 3,162,541 | * | 12/1964 | Battista . |
| 5,123,962 | * | 6/1992 | Komuro et al. . |
| 5,342,641 | * | 8/1994 | Masutake et al. . |
| 5,441,753 | * | 8/1995 | McGinley et al. . |
| 5,514,655 | * | 5/1996 | DeWille et al. . |
| 5,681,600 | * | 10/1997 | Antinone et al. . |
| 5,700,397 | * | 12/1997 | Maeda et al. . |
| 5,736,177 | * | 4/1998 | McGinley et al. . |
| 6,025,007 | * | 2/2000 | Krawczyk . |

FOREIGN PATENT DOCUMENTS

| | | | |
|---|---|---|---|
| 0140442 | * | 5/1985 | (EP) . |
| 6-57176 | * | 3/1994 | (JP) . |
| 7-69865 | * | 3/1995 | (JP) . |
| 7-79712 | * | 3/1995 | (JP) . |
| 7-101881 | * | 4/1995 | (JP) . |
| 7-101882 | * | 4/1995 | (JP) . |
| 7-101883 | * | 4/1995 | (JP) . |
| 7-101884 | * | 4/1995 | (JP) . |
| 7-97339 | * | 4/1995 | (JP) . |
| 7-99929 | * | 4/1995 | (JP) . |
| 7-99930 | * | 4/1995 | (JP) . |
| 7-99947 | * | 4/1995 | (JP) . |

* cited by examiner

Primary Examiner—Cynthia L. Nessler
(74) Attorney, Agent, or Firm—Knobbe, Martens, Olson & Bear, LLP.

(57) ABSTRACT

To provide a water-dispersible carotenoid pigment preparation which can be added to various aqueous compositions with retaining dispersion stability excellent in a wide temperature range, particularly even in a low temperature range, a carotenoid-containing aqueous composition comprising a carotenoid pigment with retaining its dispersion stability in a wide temperature range, and a method of stabilizing a dispersion state of a carotenoid pigment in an aqueous composition in a wide temperature range, a dispersion state of the carotenoid pigment in the aqueous composition is stabilized by adding the carotenoid pigment, the dispersion stability containing the soybean extract fiber as an effective ingredient, and optionally tomato juice to the aqueous composition, and the water-dispersible carotenoid pigment preparation is prepared by blending the carotenoid pigment, and the dispersion stability containing the soybean extract fiber as an effective ingredient.

7 Claims, No Drawings

WATER-DISPERSIBLE CAROTENOID PIGMENT PREPARATION

TECHNICAL FIELD

The present invention relates to a water-dispersible carotenoid pigment preparation, an aqueous composition comprising a carotenoid pigment, and a method of stabilizing a dispersion state of a carotenoid pigment in an aqueous composition. Specifically, the present invention relates to a water-dispersible carotenoid pigment preparation which can be added to various aqueous compositions with retaining dispersion stability excellent in a wide temperature range, particularly even in a low temperature range, an aqueous composition comprising a carotenoid pigment with retaining its dispersion stability in a wide temperature range, and a method of stabilizing a dispersion state of a carotenoid pigment in an aqueous composition in a wide temperature range.

BACKGROUND ART

A carotenoid pigment is known as one of pigments that are widely used for coloring of food, cosmetics, medicines, and the like. The carotenoid pigment is oil-soluble and characterized in that its color in the state of being dissolved in oil (oleo-resin) is different from that in the form of crystal. Utilizing this characteristic, there are two types of coloring of an aqueous composition using a carotenoid pigment: one type is coloring of an aqueous composition by emulsifying a carotenoid pigment in the form of oleo-resin in it; and another type is coloring of an aqueous composition by dispersing pulverized crystals of a carotenoid pigment in it.

Among the above two types of the aqueous compositions, the carotenoid pigment crystal dispersion type is inferior in stability to the oleo-resin emulsion type. It was found that aggregation of crystal particles of the former type is accelerated, particularly, in a condition of low temperature such as 10° C. or lower. This characteristic leads deterioration of the visual commercial value as a result of precipitation of aggregates of the crystals when used in drinks or the like, which have many opportunities of distribution, preservation, and exhibition at a low temperature. Therefore, when a carotenoid pigment is applied to food, the use of the carotenoid pigment crystals for coloring by dispersing in an aqueous composition is limited to solid foods such as kneaded products, jellies, candies, ice candies, and the like, which are obtained by dispersing the pigment in a composition and solidifying it. Thus, it is difficult to apply them to drinks (liquid food).

Known conventional methods of improving dispersion stability of a carotenoid pigment in an aqueous composition include a method of adding viscous polysaccharide such as pectin, or xanthane gum together with a carotenoid pigment, a method of using a water-dispersible carotenoid pigment powdery composition comprising a carotenoid pigment having a particle diameter of less than 0.1 μm and sodium laurylsulfate (Japanese Patent Application Laid-open No. 52-84232), a method of dispersing a pulverized carotenoid pigment in an aqueous composition (Japanese Patent Application Laid-open No. 7-90188), a method of incorporating a carotenoid pigment, particularly β-carotene, in cyclodextrin and dispersing it in an aqueous composition (Japanese Patent Application Laid-open No. 62-267261), a method of incorporating lycopene, one of carotenoid pigments, in γ-cyclodextrin, and adding the resulting inclusion compound in an aqueous composition together with gluten and/or ascorbic acid (Japanese Patent Application Laid-open No. 8-259829), and the like. It cannot be said that dispersion stability of a carotenoid pigment in an aqueous solution prepared by any of the above methods is not satisfactory in a low temperature range.

DISCLOSURE OF THE INVENTION

The present invention has been made from the above viewpoint, and an object of the invention is to provide a water-dispersible carotenoid pigment preparation which can be added to various aqueous compositions while retaining dispersion stability excellent in a wide temperature range, particularly even in a low temperature range, a carotenoid-containing aqueous composition comprising a carotenoid pigment while retaining its dispersion stability in a wide temperature range, and a method of stabilizing a dispersion state of a carotenoid pigment in an aqueous composition in a wide temperature range.

As a result of intensive investigation in order to achieve the above object, it was found that addition of a dispersion stabilizer containing soybean extract fiber as an effective ingredient to a carotenoid pigment can confer sufficient dispersion stability on the carotenoid pigment in a wide temperature range, particularly even in a low temperature range such as 10° C. or less, to thereby complete the present invention.

Thus, the present invention relates to a water-dispersible carotenoid pigment preparation comprising a carotenoid pigment and a dispersion stabilizer containing soybean extract fiber as an effective ingredient.

The ratio of the carotenoid pigment to the dispersion stabilizer in the water-dispersible carotenoid pigment preparation of the present invention specifically ranges from about 1:10 to 1:2,000 in terms of the weight ratio of the carotenoid pigment to the soybean extract fiber.

The carotenoid pigment used in the water-dispersible carotenoid pigment preparation of the present invention is specifically exemplified by lycopene.

The present invention also provides an aqueous composition comprising a carotenoid pigment and a dispersion stabilizer containing soybean extract fiber as an effective ingredient.

In the aqueous composition of the present invention, it is preferable to further add tomato juice in addition to the above carotenoid pigment and the dispersion stabilizer containing soybean extract fiber as an effective ingredient.

Further, the content of the dispersion stabilizer is specifically exemplified by approximately 0.01 to 1 wt % in terms of the amount of the soybean extract fiber based on the total weight of the composition.

Furthermore, the present invention provides a method of stabilizing a dispersion state of a carotenoid pigment in an aqueous composition, which comprises the step of adding the carotenoid pigment, a dispersion stabilizer containing a soybean extract fiber as an effective ingredient, and optionally tomato juice to the aqueous composition.

The present invention will be illustrated in detail below. The water-dispersible carotenoid pigment preparation of the present invention will be explained first.

(1) The Water-dispersible Carotenoid Pigment Preparation

The water-dispersible carotenoid pigment preparation of the present invention comprises a carotenoid pigment and a dispersion stabilizer containing soybean extract fiber as an effective ingredient.

As the carotenoid pigment used in the present invention, any naturally-occurring or synthetic compound classified into carotenoid pigments can be used without any restriction. Specific examples thereof include β-carotene, lycopene, lutein, spheroidene, spirilloxanthin, bixin, violaxanthin, canthaxanthin, astaxanthin, cryptoxanthin, zeaxanthin, β-apo-8'-carotinal, and the like. According to the present invention, these compounds can be used alone or in combination of two or more thereof.

Further, among the above carotenoid pigments, lycopene is used particularly effectively in the present invention.

The above carotenoid pigments can be obtained by isolating and purifying from natural sources, which are known to contain them, including green plants, fungi, yeast, mushrooms, bacteria, and the like, by the usual method. Alternatively, they can be produced by chemical synthesis by the usual method from starting materials usually used. Since many of the carotenoid pigments are commercially available, these can also be used in the present invention.

Among the commercially available carotenoid pigments, there are various products having different particle diameters depending on, particularly, their use. The carotenoid pigments to be used in the present invention have the particle diameter of preferably about 0.20 to 0.40 μm, particularly preferably about 0.20 to 0.30 μm in view of dispersion stability, particularly in a low temperature range.

The soybean extract fiber used as an effective ingredient in the dispersion stabilizer of the present invention is classified into water-soluble hemicellulose, which is a component constituting the soybean cell wall and a polysaccharide fraction exclusive of cellulose and pectin. It can be obtained from a raw material containing soybean hemicellulose by extraction with water or, as the case may be, elusion by heating under the acidic or alkaline condition or by enzymatic degradation.

Specifically, the raw material containing soybean hemicellulose includes tofu, soybean milk, bean-curd refuse that is a by-product in isolation of soybean protein, and the like. The raw material is decomposed by heating at preferably 80 to 130° C., more preferably 100 to 130° C., under acidic or alkaline condition, preferably at the pH in the vicinity of the isoelectric point of the protein, fractionating the decomposed products to isolate an aqueous fraction, which is dried as it is or after removing hydrophobic substances or low molecular weight substances by carrying out, for example, treatment with active carbon, treatment with resin adsorbent, ethanol precipitation, or the like, to obtain the above soybean extract fiber.

Although the molecular weight of the soybean extract fiber used in the present invention is not particularly limited, it is preferably ranges from several thousands to several millions, more preferably 5,000 to one million in terms of the mean molecular weight (the value determined by extreme viscosity method in which viscosity is measured in a 0.1 M $NaNO_3$ solution using standard pullulan as a standard substance). When the molecular weight of the soybean extract fiber is so high as to give too high viscosity of the solution, a good dispersion state cannot be sometimes obtained. Accordingly, the above production steps may further include a treatment for reducing the molecular weight. The molecular weight reducing treatment can be carried out under more strict heating condition at the step of decomposition by heating. Alternatively, it can be carried out by treating a solution resulted from decomposition and extraction of soybean hemicellulose using alkali, acid, enzyme or by heating. The viscosity of the soybean extract fiber solution is, for example in a 10% solution, preferably not more than 150 centigrade poise, more preferably not more than 60 centigrade poise, particularly preferably not more than 30 centigrade poise.

The dispersion stabilizer containing such a soybean extract fiber as an effective ingredient is marketed and easily available. An example of the commercially available products is Soyafive (trade name, Fuji Oil Co.).

The soybean extract fiber can be used alone as the dispersion stabilizer or used in combination with water-soluble hemicellulose other than the soybean extract fiber, and further the other known dispersion stabilizer. A specific example of the water-soluble hemicellulose other than the soybean extract fiber which is capable of using with it in combination is water-soluble hemicellulose obtained in the same manner as in the case of obtaining the above soybean extract fiber using as a raw material the husk of oil cake seed, such as palm, coconut palm, corn, or cottonseed, from which oil and fat and protein have been removed, or cake of grains, such as rice or wheat, from which starch and the like have been removed.

The other known dispersion stabilizers which can be used in combination include unimolecular dispersion stabilizer such as various anionic surface active agents represented by fatty acid soap, cationic surface active agents such as quaternary ammonium salts, nonionic surface active agents such as glycerol fatty acid ester or sugar ester, amphoteric surface active agents such as lecithin, and the like. Examples of macromolecular dispersion stabilizers include natural dispersion stabilizers such as glue plant, agar, carrageenan, farseleran, tamarind seed polysaccharide, tara gum, karaya gum, pectin, xanthan gum, sodium alginate, traganth gum, gourd gum, locust bean gum, pullulan, geran gum, gum arabic, gelatin, albumin such as whey, sodium casein, various starch, and the like, semisynthetic paste such as carboxymethylcellulose, methylcellulose, hydroxyethylcellulose, propylene glycol alginate, processed starch represented by soluble starch, and the like, synthetic paste such as polyvinyl alcohol, sodium polyacrylate, and the like.

The mixing ratio of the carotenoid pigment to the dispersion stabilizer in the water-dispersible carotenoid pigment preparation of the present invention is exemplified by preferably from about 1:10 to 1:2,000, more preferably about 1:100 to 1:1,000, in terms of the weight ratio of the carotenoid pigment to the soybean extract fiber. If the ratio of the soybean extract fiber to the carotenoid pigment is lower than the above-described range, the carotenoid pigment is sometimes not sufficiently dispersed in water. If the ratio is higher than the above-described range, physicochemical properties of the resulting aqueous composition are sometimes so affected as not to be ignored. Further, various components other than those described above can be added in the water-dispersible carotenoid pigment preparation of the present invention if necessary as long as they do not interfere the effect of the invention.

The water-dispersible carotenoid pigment preparation of the present invention can be produced by mixing the above carotenoid pigment, the dispersion stabilizer containing soybean extract fiber as an effective ingredient, and, if necessary, the components arbitrarily added by an appropriate method.

In the water-dispersible carotenoid pigment preparation of the present invention obtainable as described above, the carotenoid pigment can be added in various aqueous composition with retaining excellent dispersion stability in a wide temperature range, particularly even in a low temperature range such as not more than 10° C., by the effect of the soybean extract fiber contained in the preparation.

Next, the aqueous composition containing the carotenoid pigment according to the present invention will be described.

(2) The Aqueous Composition

The aqueous composition of the present invention comprises the carotenoid pigment and the dispersion stabilizer containing soybean extract fiber as an effective ingredient. The same carotenoid pigment and the dispersion stabilizer containing soybean extract fiber as an effective ingredient as described in (1) above can be used in the aqueous composition of the present invention.

Any aqueous composition, including food, cosmetics, medicines, and the like, can be used as the aqueous composition of the present invention as long as it is a liquid composition containing an aqueous component as a solvent or a dispersion medium. Among these, the present invention can be applied preferably or effectively to liquid food, that is, drinks.

The content of the above carotenoid pigment in the aqueous composition of the present invention is appropriately selected depending on the use and type of the aqueous composition to be applied. It is the same amount as that of the carotenoid pigment generally added in the aqueous composition. Specifically, it ranges from about 0.0005 to 0.1 wt %, preferably about 0.001 to 0.01 wt %, based on the total weight of the composition.

The content of the dispersion stabilizer in the aqueous composition of the present invention is preferably about 0.01 to 1 wt %, more preferably 0.1 to 0.5 wt %, in terms of the amount of the soybean extract fiber based on the total weight of the composition. If the content of the soybean extract fiber in the aqueous composition of the present invention is less than 0.01 wt %, sufficient dispersion stability of the carotenoid pigment cannot be always obtained. If it exceeds 1 wt %, texture of the aqueous composition sometimes changes.

The ratio of the content of the carotenoid pigment to the dispersion stabilizer in the aqueous composition of the present invention is preferably about 1:10 to 1:2,000, more preferably about 1:100 to 1;1,000, in terms of the weight ratio of the carotenoid pigment to the soybean extract fiber. If the ratio of the soybean extract fiber to the carotenoid pigment is lower than the above range, sufficient dispersion stability of the carotenoid pigment cannot be always obtained. If it exceeds the above range, the influence on physicochemical properties of the resulting aqueous composition cannot be always ignored.

The above aqueous composition of the present invention can be produced by the usual production method except that the above carotenoid pigment and the dispersion stabilizer containing soybean extract fiber as an effective ingredient are added to the components that are usually contained in an aqueous composition preferably to give the respective contents as described above and the resulting composition is mixed by the common method so that the above components are homogeneously contained in the aqueous composition.

It is preferable to add tomato juice in the aqueous composition of the present invention in addition to the above-described components in view of dispersion stability of the carotenoid pigment.

The above tomato juice is exemplified by that obtained from tomato fruits according to the usual method. A specific method for obtaining such tomato juice is exemplified by the method which comprises smashing raw tomatoes, which have been washed and selected, using a crusher or the like, if necessary, heating the smashed tomatoes by a tube heater or the like for sterilization and inactivation of enzymes, and squeezing them using an extractor, a pulper finisher or the like.

The content of the tomato juice in the aqueous composition of the present invention varies depending on the content of the carotenoid pigment and the dispersion stabilizer contained in the aqueous composition. For example, it can be said that dispersion stability of the carotenoid pigment can be improved if the tomato juice is contained in an amount of about 3 to 10 wt % based on the total weight of the composition. Particularly, in the case that the aqueous composition is food such as drink or the like, it is preferably to select the content of the tomato juice taking taste, texture, etc. of the obtained aqueous composition into consideration.

In the above aqueous composition of the present invention, the carotenoid pigment shows good dispersion stability in the wide temperature range. Particularly, its dispersion stability in the low temperature range such as not more than 10° C. is sufficiently improved, which has been difficult to improve by the conventional techniques.

Next, the method of stabilizing a dispersion state of a carotenoid pigment in the aqueous composition of the present invention will be described.

(3) The Method of Stabilizing a Dispersion State of the Carotenoid Pigment in the Aqueous Composition The method of stabilizing a dispersion state of a carotenoid pigment in the aqueous composition of the present invention comprises the step of adding the carotenoid pigment, a dispersion stabilizer containing a soybean extract fiber as an effective ingredient, and optionally tomato juice to the aqueous composition.

The carotenoid pigment, a dispersion stabilizer containing a soybean extract fiber as an effective ingredient, and tomato juice to be added in the aqueous composition are the same as those described in (1) and (2) above. The aqueous composition, to which the present invention is applied, is also the same as that described in (2) above.

The amount of the dispersion stabilizer to be added in the aqueous composition varies depending on the aqueous composition. The stabilizer is added to give preferably the weight ratio of the carotenoid pigment to the soybean extract fiber in the dispersion stabilizer ranging from about 1:10 to 1:2,000, more preferably about 1:100 to 1:1,000. If the weight of the dispersion stabilizer added gives the above ratio lower than the above range, sufficient dispersion stability of the carotenoid pigment cannot be always obtained.

According to the method of stabilizing a dispersion state of the present invention, the content of the tomato juice to be optionally added to the aqueous composition is the same as described in (2) above.

The above-described method of stabilizing a dispersion state of the carotenoid pigment of the present invention can secure sufficient dispersion stability of the carotenoid pigment in the aqueous composition in a wide temperature range, particularly even in a low temperature range such as not more than 10° C.

BEST MODE FOR CARRYING OUT THE INVENTION

Examples of the present invention will be demonstrated below.

Example 1

Transparent concentrated apple juice (Flucore) was reduced to 10% in Brix to serve as a base clear juice. Then, 0.5 g of a crystal dispersion type of a carotenoid preparation (containing 2.5 wt % of lycopene pigment in the form of crystal dispersion (Saneigen F.F.I.)) was added to 1,000 g of this clear juice. Further, a commercially available soybean extract fiber (trade name: Soybean dietary fiber SM-900, Saneigen F.F.I.) was added thereto to give a concentration of 0.5 wt % based on the total weight of the drink. After stirring and mixing to completely disperse the lycopene pigment, the mixture was heated to 93° C. for sterilization to obtain an apple juice-containing drink. Then, the resulting drink was added into a container. The color of the thus-obtained apple juice-containing drink was red which reflected the crystal form of the lycopene pigment.

The crystal dispersion type carotenoid preparation used in Example 1 is a product prepared by dispersing the crystal form of the lycopene pigment in a base containing glycerol fatty acid ester, sucrose fatty acid ester, vitamin C, and glycerol as main components to give a concentration of 2.5 wt % based on the total weight of the carotenoid preparation.

For comparison, the same procedure as in Example 1 was repeated except for using pectin (trade name: Pectin AYD-30, Snow Brand Food) or xanthane gum (trade name: San Ace, Saneigen F.F.I.) in place of the soybean extract fiber to prepare apple juice-containing drinks of Comparative Examples 1 and 2. Further, as a control, an apple juice-containing drink was prepared in the same manner as in Example 1 except for adding no soybean extract fiber. The drinks obtained above were each added into containers. The colors of the thus-obtained apple juice-containing drinks of Comparative Examples and control were the same as that of Example 1.

Reference Example 1

Transparent concentrated apple juice (Flucore) was reduced to 10% in Brix to serve as a base clear juice. Then, 0.5 g of an emulsion type of a carotenoid preparation (containing 2.5 wt % of lycopene pigment in the form of emulsion (Saneigen F.F.I.) was added to 1,000 g of this clear juice. After stirring and mixing, the mixture was heated to 93° C. for sterilization to obtain an apple juice-containing drink of Reference Example 1. Then, the resulting drink was added into a container. The color of the thus-obtained apple juice-containing drink in Reference Example 1 was orange which reflected the dissolved form of lycopene pigment.

The emulsion type carotenoid preparation used in Reference Example 1 is a product prepared by emulsifying the lycopene pigment, which has been dissolved in an oil component, in a base containing glycerol fatty acid ester, sucrose fatty acid ester, vitamin C, and glycerol as main components to give a concentration of the lycopene pigment of 2.5 wt % based on the total weight of the carotenoid preparation.

[Evaluation of the Aqueous Composition of the Present Invention]

Each of the apple juice-containing drinks obtained in the above Example, Comparative Example, and Reference Example was maintained at different temperatures as shown in Table 1 as well as the above control apple juice-containing drink to evaluate the time-course change of the dispersion state of crystals of the carotenoid pigment or the emulsion state of the substance dissolving the carotenoid pigment in accordance with the following criterion for evaluation. The results are shown in Table 1.

<Criterion for Evaluation>
- −: No problem is found in the dispersion state or the emulsion state.
- ±: No outstanding precipitation of crystals of the carotenoid pigment was observed except for slight turbidity.
- +: Aggregation of crystals of the carotenoid pigment can be observed by naked eyes.
- ++: Considerable aggregation of crystals of the carotenoid pigment was observed.
- +++: Aggregation of crystals of the carotenoid pigment proceeds and the upper layer of the liquid becomes clear. (Separation begins.)
- ++++: Crystals of the carotenoid pigment aggregate and precipitate and the whole liquid is clear.

TABLE 1

|  |  | At the time of starting | After 5 days | After 10 days | After 40 days | After 80 days |
|---|---|---|---|---|---|---|
| 0° C. | Drink of Example 1 | − | − | − | ± | + |
|  | Drink of Comparative Example 1 | − | ± | ± | ++ | +++ |
|  | Drink of Comparative Example 2 | − | + | ++ | ++++ | ++++ |
|  | Contral | − | + | +++ | ++++ | ++++ |
|  | Drink of Reference Example 1 | − | − | − | − | − |
| 10° C. | Drink of Example 1 | − | − | − | − | − |
|  | Drink of Comparative Example 1 | − | ± | ± | + | ++ |
|  | Drink of Comparative Example 2 | − | ± | + | ++ | ++++ |
|  | Contral | − | ± | + | +++ | ++++ |
|  | Drink of Reference Example 1 | − | − | − | − | − |
| 28° C. | Drink of Example 1 | − | − | − | − | − |
|  | Drink of Comparative Example 1 | − | − | − | − | − |
|  | Drink of Comparative Example 2 | − | − | − | − | − |
|  | Contral | − | − | − | ± | ± |
|  | Drink of Reference Example 1 | − | − | − | − | − |

From these results, it can be seen that the apple juice-containing drink of Example comprising the carotenoid pigment together with the soybean extract fiber can sufficiently prevent aggregation and precipitation of the carotenoid pigment in a wide temperature range, particularly even in a low temperature range such as not more that 10° C. as compared with the apple juice-containing drinks of Comparative Examples 1 and 2 comprising pectin and xanthane gum, respectively, which are conventionally used as a dispersion stabilizer, in place of the soybean extract fiber, and the control apple juice-containing drink comprising no dispersion stabilizer. Further, it is clear that the apple juice-containing drink of Example can maintain dispersion stability of the carotenoid pigment over a long period of time comparable to emulsion stability of the dissolved and emulsified state of the carotenoid pigment contained in the apple juice-containing drink of Reference Example 1.

Example 2

Transparent concentrated orange juice (Northwest) was reduced to 11% in Brix to serve as a base clear juice. Then, 0.5 g of a crystal dispersion type of a carotenoid preparation (containing 2.5 wt % of β-carotene pigment in the form of crystal dispersion (Saneigen F.F.I.)) was added to 1,000 g of this clear juice. Further, a commercially available soybean extract fiber (trade name: Soybean dietary fiber SM-900, Saneigen F.F.I.) was added thereto to give a concentration of 0.5 wt % based on the total weight of the drink. After stirring and mixing to completely disperse the β-carotene pigment, the mixture was heated to 93° C. for sterilization to obtain an orange juice-containing drink. Then, the resulting drink was added into a container. The color of the thus-obtained orange juice-containing drink was yellowish orange which reflected the crystal form of the β-carotene pigment.

The crystal dispersion type carotenoid preparation used in Example 2 is a product prepared by dispersing the crystal form of the β-carotene pigment in a base containing glycerol fatty acid ester, sucrose fatty acid ester, vitamin C, and glycerol as main components to give a concentration of 2.5 wt % based on the total weight of the carotenoid preparation.

For comparison, the same procedure as in Example 2 was repeated except for using pectin (trade name: Pectin AYD-30, Snow Brand Food) or xanthane gum (trade name: San Ace, Saneigen F.F.I.) in place of the soybean extract fiber to prepare orange juice-containing drinks of Comparative Examples 3 and 4. Further, as a control, an orange juice-containing drink was prepared in the same manner as in Example 2 except for adding no soybean extract fiber. The drinks obtained above were each added into containers. The colors of the thus-obtained orange juice-containing drinks of Comparative Examples and control were the same as that of Example 2.

Reference Example 2

Transparent concentrated orange juice (Northwest) was reduced to 11% in Brix to serve as a base clear juice. Then, 0.5 g of an emulsion type of a carotenoid preparation (containing 2.5 wt % of β-carotene pigment in the form of emulsion (Saneigen F.F.I.) was added to 1,000 g of this clear juice. After stirring and mixing, the mixture was heated to 93° C. for sterilization to obtain an orange juice-containing drink of Reference Example 2. Then, the resulting drink was added into a container. The color of the thus-obtained orange juice-containing drink in Reference Example 2 was yellow which reflected the dissolved form of the β-carotene pigment.

The emulsion type carotenoid preparation used in Reference Example 2 is a product prepared by emulsifying the β-carotene pigment, which has been dissolved in an oil component, in a base containing glycerol fatty acid ester, sucrose fatty acid ester, vitamin C, and glycerol as main components to give a concentration of the β-carotene pigment of 2.5 wt % based on the total weight of the carotenoid preparation.

[Evaluation of the Aqueous Composition of the Present Invention]

Each of the orange juice-containing drinks obtained in the above Example, Comparative Examples, and Reference Example was maintained at different temperatures as shown in Table 2 as well as the above control orange juice-containing drink to evaluate the time-course change of the dispersion state of crystals of the carotenoid pigment or the emulsion state of the substance dissolving the carotenoid pigment in accordance with the criterion for evaluation as described above. The results are shown in Table 2.

TABLE 2

| | | At the time of starting | After 5 days | After 10 days | After 40 days | After 80 days |
|---|---|---|---|---|---|---|
| 0° C. | Drink of Example 2 | − | − | − | ± | + |
| | Drink of Comparative Example 3 | − | ± | ± | ++ | +++ |
| | Drink of Comparative Example 4 | − | + | ++ | ++++ | ++++ |
| | Contral | − | + | +++ | ++++ | ++++ |
| | Drink of Reference Example 2 | − | − | − | − | − |
| 10° C. | Drink of Example 2 | − | − | − | − | − |
| | Drink of Comparative Example 3 | − | ± | ± | + | ++ |

TABLE 2-continued

| | | At the time of starting | After 5 days | After 10 days | After 40 days | After 80 days |
|---|---|---|---|---|---|---|
| | Drink of Comparative Example 4 | − | ± | + | ++ | ++++ |
| | Contral | − | ± | + | +++ | ++++ |
| | Drink of Reference Example 2 | − | − | − | − | − |
| 28° C. | Drink of Example 2 | − | − | − | − | − |
| | Drink of Comparative Example 3 | − | − | − | − | − |
| | Drink of Comparative Example 4 | − | − | − | − | − |
| | Contral | − | − | − | ± | ± |
| | Drink of Reference Example 2 | − | − | − | − | − |

From these results, it can be seen that the orange juice-containing drink of Example comprising the carotenoid pigment together with the soybean extract fiber can sufficiently prevent aggregation and precipitation of the carotenoid pigment in a wide temperature range, particularly in the low temperature range such as not more than 10° C. as compared with the orange juice-containing drinks of Comparative Examples 3 and 4 comprising pectin and xanthane gum, respectively, which are conventionally used as a dispersion stabilizer, in place of the soybean extract fiber, and the control orange juice-containing drink comprising no dispersion stabilizer. Further, it is clear that the orange juice-containing drink of Example can maintain dispersion stability of the carotenoid pigment over a long period of time comparable to emulsion stability of the dissolved and emulsified state of the carotenoid pigment contained in the orange juice-containing drink of Reference Example 2.

Examples 3 to 7

Transparent concentrated apple juice (Flucore) was reduced to 10% in Brix to serve as a base clear juice. Then, 0.5 g of the same crystal dispersion type of the carotenoid preparation as used in Example 1 (containing 2.5 wt % of lycopene pigment in the form of crystal dispersion (Saneigen F.F.I.)) and 5 g of a commercially available soybean extract fiber (trade name: Soybean dietary fiber SM-700, Saneigen F.F.I.) were added to 1,000 g of this clear juice. Further, tomato juice, which was obtained by squeezing raw tomatoes by a household juicer, was added thereto to give a concentration of 3 wt % based on the total weight of the drink. After stirring and mixing to completely disperse the lycopene pigment, the mixture was heated to 93° C. for sterilization to obtain an apple juice-containing drink (Example 3). Then, the resulting drink was added into a container.

The same procedure as described above was repeated except for changing the content of the tomato juice to prepare an apple juice-containing drink comprising 5 wt % of the tomato juice (Example 4), an apple juice-containing drink comprising 10 wt % of the tomato juice (Example 5), and an apple juice-containing drink comprising no tomato juice (Example 6). Further, an apple juice-containing drink (Example 7) was prepared in the same manner as described above except for adding clear tomato juice, which was obtained by centrifuging tomato juice (3,000 rpm x 5 minutes) to remove pulp components, to 5 wt % in place of adding the above tomato juice to 3 wt %. As a control, an apple juice-containing drink was prepared in the same manner as described above except for adding no soybean extract fiber in Example 6. The thus-obtained drinks were added into respective containers as described above.

[Evaluation of the Aqueous Composition of the Present Invention]

Each of the apple juice-containing drinks obtained in the above Examples was maintained at the freezing point as well as the above control apple juice-containing drink to evaluate the time-course change of the dispersion state of crystals of the carotenoid pigment in accordance with the criterion for evaluation as described above. The results are shown in Table 3. In Table 3, the parenthetical evaluation results means that precipitation was attributed to pulp in the tomato juice. At the column of the concentration of the tomato juice, numerals with * show the concentration of the clear tomato juice in place of the tomato juice.

TABLE 3

|  | Concentration (wt %) | | At the time of starting | After 10 Days | After 30 Days | After 60 Days | After 90 Days |
| --- | --- | --- | --- | --- | --- | --- | --- |
|  | Soybean extract fiber | Tomato juice | | | | | |
| Example 3 | 5 | 3 | − | − | − | ± | + |
| Example 4 | 5 | 5 | − | − | − | − | − |
| Example 5 | 5 | 10 | − | (+) | (++) | (++) | (++) |
| Example 6 | 5 | none | − | − | ± | ± | ++ |
| Example 7 | 5 | 5* | − | − | ± | ± | ++ |
| Control | none | none | − | ++ | ++++ | ++++ | ++++ |

From these results, it was found that, when a carotenoid pigment is added in an aqueous composition, dispersion stability of the carotenoid pigment can be improved by adding tomato juice in addition to soybean extract fiber as compared with addition of soybean extract fiber alone. When tomato juice is used, pulp components originated therein sometimes precipitates depending on the amount of the tomato juice and, therefore, its amount to be added must be considered depending on its use. Further, when the clear tomato juice was used, its contribution to dispersion stability of the carotenoid pigment in the aqueous composition was not observed.

Industrial Applicability

The water-dispersible carotenoid pigment preparation of the present invention can be added to various aqueous compositions with retaining excellent dispersion stability in a wide temperature range, particularly even in the low temperature range. Further, the aqueous composition of the present invention can sufficiently maintain dispersion stability of the contained carotenoid pigment in a wide temperature range, particularly even in a low temperature range. Furthermore, the method of the present invention can sufficiently stabilize a dispersion state of the carotenoid pigment in the aqueous composition in a wide temperature range, particularly even in a low temperature range.

What is claimed is:

1. A water-dispersible carotenoid pigment preparation comprising pulverized crystals of a carotenoid pigment and a dispersion stabilizer containing soybean extract fiber as an effective ingredient.

2. The water-dispersible carotenoid pigment preparation as claimed in claim 1, wherein the ratio of the pulverized crystals of the carotenoid pigment to the dispersion stabilizer in the preparation ranges from 1:10 to 1:2,000 in terms of the weight ratio of the carotenoid pigment to the soybean extract fiber.

3. The water-dispersible carotenoid pigment preparation as claimed in claim 1, wherein said pulverized crystals of the carotenoid pigment is lycopene.

4. An aqueous composition comprising pulverized crystals of a carotenoid pigment and a dispersion stabilizer containing soybean extract fiber as an effective ingredient.

5. The aqueous composition as claimed in claim 4, which further comprises tomato juice.

6. The aqueous composition as claimed in claim 4, wherein the content of the dispersion stabilizer is 0.01 to 1 wt % in terms of the amount of the soybean extract fiber based on the total weight of the composition.

7. A method of stabilizing a dispersion state of pulverized crystals of a carotenoid pigment in an aqueous composition, which comprises the step of adding the carotenoid pigment, a dispersion stabilizer containing a soybean extract fiber as an effective ingredient, and tomato juice to the aqueous composition.

* * * * *